United States Patent [19]
Wheatly et al.

[11] Patent Number: 5,552,927
[45] Date of Patent: Sep. 3, 1996

[54] ALL-POLYMERIC COLD MIRROR

[75] Inventors: John A. Wheatly; Gregg A. Motter, both of Midland, Mich.

[73] Assignee: The Dow Chemical Company, Midland, Mass.

[21] Appl. No.: 222,028

[22] Filed: Apr. 4, 1994

Related U.S. Application Data

[63] Continuation of Ser. No. 963,305, Oct. 16, 1992, Pat. No. 5,339,198.

[51] Int. Cl.$^6$ .............................. G02B 1/10; G02B 5/26; G02B 5/28
[52] U.S. Cl. ..................... 359/359; 359/584; 359/586; 359/588; 359/589
[58] Field of Search ...................... 359/359, 360, 359/580, 584, 586, 588, 589; 428/213

[56] References Cited

U.S. PATENT DOCUMENTS

| | | |
|---|---|---|
| 3,645,601 | 2/1972 | Doctoroff et al. . |
| 3,711,176 | 1/1973 | Alfrey, Jr. et al. .................... 359/359 |
| 3,759,647 | 9/1973 | Schreuk et al. . |
| 3,773,882 | 10/1971 | Schrenk . |
| 3,884,606 | 5/1975 | Schrenk . |
| 3,944,320 | 3/1976 | McLintic . |
| 4,380,794 | 4/1983 | Lawson . |
| 4,604,680 | 8/1986 | Levin et al. . |
| 4,927,239 | 5/1990 | Melzig et al. ............................ 359/580 |
| 4,937,134 | 6/1990 | Schrenk et al. . |
| 5,024,895 | 6/1991 | Kavanagh et al. . |
| 5,066,082 | 11/1991 | Longstaff . |
| 5,084,351 | 1/1992 | Philips et al. . |
| 5,095,210 | 3/1992 | Wheatley et al. ...................... 359/359 |
| 5,103,337 | 4/1992 | Schrenk et al. ....................... 359/359 |
| 5,122,905 | 6/1992 | Wheatley et al. ...................... 359/586 |
| 5,122,906 | 6/1992 | Wheatley ................................ 359/586 |
| 5,126,880 | 6/1992 | Wheatley et al. ...................... 359/586 |
| 5,140,457 | 8/1992 | Letter . |
| 5,149,578 | 9/1992 | Wheatley et al. ...................... 359/359 |
| 5,178,955 | 1/1993 | Aharoni et al. ........................ 359/580 |
| 5,233,465 | 8/1993 | Wheatley et al. ...................... 359/359 |
| 5,262,894 | 11/1993 | Wheatley et al. . |
| 5,278,694 | 1/1994 | Wheatley et al. ...................... 359/359 |

FOREIGN PATENT DOCUMENTS

| | | |
|---|---|---|
| 1262163 | 2/1972 | United Kingdom . |
| 2202963 | 10/1988 | United Kingdom . |

*Primary Examiner*—Martin Lerner

[57] ABSTRACT

An all-polymeric cold mirror which reflects visible wavelengths while transmitting a substantial portion of infrared wavelengths is provided. The mirror includes a sufficient number of alternating layers of at least first and second diverse polymeric materials such that at least 50% of peak reflecting visible light of a wavelength of between about 380–680 nm incident on the mirror is reflected and at least 50% of infrared light between about 680–2000 nm is transmitted or absorbed. The mirror may be designed so that it either reflects or absorbs ultraviolet light.

25 Claims, 5 Drawing Sheets

ALL-POLYMERIC COLD MIRROR

This is a continuation of application Ser. No. 07/963,305 filed Oct. 16, 1992, now U.S. Pat. No. 5,339,198.

BACKGROUND OF THE INVENTION

This invention relates to a cold mirror, and more particularly to an all-polymeric cold mirror which reflects light in the visible wavelength region while transmitting a substantial portion of light in the infrared wavelength region, and which can be designed either to reflect, transmit, or absorb light in the ultraviolet region of the spectrum.

In the production of lighting systems for medical treatment, window displays, theatrical lighting, and other applications, a problem exists from the harmful effects of infrared or ultraviolet light on illuminated objects. Light sources which emit infrared radiation can cause heating of illuminated objects, which is often undesirable and damaging. For example, certain jewels such as rubies and pearls have a substantial water content. Such jewels lose their luster if moisture is lost because of infrared heating from lights used to illuminate the jewels.

Light sources which emit ultraviolet radiation can also be damaging to illuminated objects. For example, it has been found that ultraviolet radiation is a contributing factor to the fading of colors in oil paintings and tapestries displayed in museums and galleries. General merchandise displays in retail outlets may also be subject to damage from ultraviolet radiation. Further, the combination of ultraviolet and infrared radiation from light sources may cause even more rapid degradation of illuminated objects.

To combat this problem, cold mirrors, also referred to as cold light mirrors, have been developed which reflect, visible wavelengths of light, but transmit longer-wave infrared or shorter-wave ultraviolet radiation. The cold mirrors are arranged so that visible light from a light source is reflected onto an object to be illuminated, while infrared radiation is transmitted through the mirror and away from the object. This minimizes heating and potential damage to the illuminated objects. Cold mirrors are currently widely used in lamps for projectors, for lighting in studios and theaters, art displays, shop windows, and in security and medical applications.

Typically, cold mirrors comprise an uneven number of absorption-free layers of high and low refracting dielectric materials applied alternately to a glass substrate. Zinc sulfide and magnesium fluoride are two commonly-used dielectric materials as well as titanium oxide and silicon dioxide. A typical method of production of such cold mirrors is high vacuum deposition.

For example, Great Britain Patent No. 1,262,163 teaches a cold mirror used in cinema projectors which is formed by the vacuum deposition of interference layers on a glass substrate. The substrate is permeable to heat radiation and comprises varying alternating layers of silicon, silicon oxide, and magnesium fluoride and titanium oxide.

An alternative to glass has been the use of a metal substrate as taught in McLintic, U.S. Pat. No. 3,944,320, which teaches a cold mirror comprising a metal substrate coated with first and second pigmented vitreous coatings and a dielectric interference coating. However, the mirror requires the addition of a black vitreous enamel which is capable of absorbing infrared radiation as the metal will reflect infrared radiation.

Doctoroff et al, U.S. Pat. No. 3,645,601 also teaches a reflector comprising an aluminum substrate including a dielectric interference coating which reflects visible wavelengths of light and absorbs or diffuses at infrared wavelengths.

However, a major disadvantage of prior art cold mirrors is that they require deposition of dielectric materials in multiple separate processing steps using relatively expensive and time consuming vacuum deposition techniques. In addition, special care must be exercised to ensure uniformity of film thickness over the entire surface of each individual substrate. Also, once deposited, the coatings and the substrates to which they are adhered cannot be further shaped or formed. Further, the coatings are subject to chipping, scratching, and/or corrosion and must be protected. All of these factors add to the expense of production. The need to deposit the layers on a glass substrate increases the thickness and weight of the final product. Because vacuum deposition techniques must be used, it is difficult and expensive to fabricate coatings which cover large surface areas; consequently, because of that difficulty and expense, many cold mirrors are relatively small. Finally, vacuum deposition cannot be used with parts having certain geometries; for example, the interior of a tube or deep cavity cannot be coated using standard vacuum deposition techniques.

Another type of cold mirror utilizes dichroic (multilayer interference film) coatings which are typically utilized on the reflectors of tungsten or halogen lamps. Such dichroic cold mirrors comprise a glass surface coated with a metal film that reflects visible light while transmitting infrared as well as absorbing ultraviolet light. For example, Levin et al U.S Pat. No. 4,604,680 teaches an infrared floodlight for security applications which uses a tungsten halogen light source and dichroic hot and cold mirrors comprising a glass substrate having multiple layers of titanium dioxide and silicon dioxide coated thereon for directing infrared radiation toward the assembly's lens. Such dichroic reflectors have been widely used in halogen lamps for museum displays to prevent degradation of works of art from prolonged exposure to ultraviolet radiation.

Lawson, U.S. Pat. No. 4,380,794, teaches a cold mirror for surgical applications comprising a high-temperature resistant polyetherimide which has vacuum-deposited thereon a dichroic coating. The high-temperature resistant polymer is used so that it will be able to withstand temperatures encountered during vacuum deposition of the dichroic coating.

Other halogen lamps produce a cooler light by a visibly transmissive, infrared reflective coating for the inner filament tube that reflects infrared radiation back toward the filament. The infrared radiation is used to maintain filament temperature and produce more visible light. However, such lamps are very expensive to produce.

Multilayer polymeric reflective films are known. Alfrey, Jr. et al, U.S. Pat. No. 3,711,176, teaches a multilayered highly reflective thermoplastic body fabricated using thin film techniques. That is, the reflective thin film layers of Alfrey, Jr. relied on the constructive interference of light to produce reflected visible, ultraviolet, or infrared portions of the electromagnetic spectrum. Such reflective thin films have found use in decorative items because of the iridescent reflective qualities of the film.

Other multilayer reflective bodies are also taught in the art. See commonly-assigned Wheatley et al, U.S. Pat. No. 5,122,905, Wheatley, U.S. Pat. No. 5,122,906, and Wheatley et al, U.S. Pat. No. 5,126,880. However, these reflective bodies are designed to be uniformly reflective over substantially the entire visible range as well as reflecting in the infrared range.

Accordingly, the need still exists in the art for cold mirrors which are inexpensive and easy to produce, and which reflect visible wavelengths of light while transmitting infrared wavelengths. The need also exists for cold mirrors which can be formed and/or bent into complex shapes, cold mirrors which are free-standing and require no glass or metal substrate for support, and cold mirrors which can be laminated to a variety of other substrates. The need also exists for cold mirrors which can be designed to reflect or absorb at ultraviolet wavelengths.

SUMMARY OF THE INVENTION

The present invention meets that need by providing an all-polymeric cold mirror which is much lower in cost to produce than previously used cold mirrors, and which may be formed as a free-standing sheet or as a film laminated to a polymeric or nonpolymeric substrate. Further, the cold mirrors of the present invention may be formed, shaped, or bent into a variety of complex shapes. By "polymeric cold mirror," we mean a body comprising multiple layers of diverse polymers which reflects a substantial portion of visible light impinging on the mirror while transmitting a substantial portion of infrared light.

The terms "reflective", "reflectivity", "reflection", and "reflectance" as used herein refer to total reflectance (i.e., ratio of reflected wave energy to incident wave energy) of a sufficiently specular nature such that the polymeric body has a metallic appearance. The use of these terms is intended to encompass semi-specular or diffuse reflection as well. For example, one or both surfaces of the cold mirror may be embossed or textured to diffuse light which is reflected or transmitted by the mirror. In general, reflectance measurement refers to reflectance of light rays into an emergent cone with a vertex angle of 15 degrees centered around the specular angle. By the term "diverse" we mean that the polymeric materials need not differ in any respect except in terms of refractive index. Thus, while adjacent layers may be chemically diverse, if such materials have the same refractive index, then for purposes of the present invention they are not "diverse".

A specific intensity of reflectance or transmission, when used herein, refers to wavelengths where no substantial absorption occurs. For example, in a preferred embodiment of the invention, the cold mirror is designed to reflect visible light having wavelengths in the range from about 380–680 nm. Light of other wavelengths, such as in the infrared range, pass through (i.e., are transmitted by) the mirror. It is at the visible wavelengths to which the intensity of reflection is referring.

According to one aspect of the present invention, an all-polymeric cold mirror of at least first and second diverse polymeric materials is provided, the mirror comprising a sufficient number of alternating layers of the first and second polymeric materials such that at least 50% of peak reflecting visible light of a wavelength of between about 380–680 nm incident on the mirror is reflected and at least 50% of infrared light between about 680–2000 nm is transmitted or absorbed. By peak reflecting visible light, we mean the wavelength in the visible range at which there is the greatest reflectance.

In one embodiment of the invention, at least 50% of ultraviolet light of a wavelength between about 300–380 nm incident on the mirror is also reflected. In an alternative embodiment of the invention, at least 50% of ultraviolet light of a wavelength between about 300–380 nm incident on the mirror is absorbed. Various means for absorbing the ultraviolet radiation may be used. Many commercially available polymers already contain UV absorbing additives. Further, in this latter embodiment, an ultraviolet absorbing dye or pigment may be provided in either an exterior layer or one or more interior layers. Such dyes or pigments may impart a metallic appearance to the mirror such as bronze, copper, gold, or other colors. Alternatively, reflections from the cold mirror ultraviolet wavelengths may be suppressed by the use of layer thickness and refractive index combinations which selectively suppress reflections at those wavelengths.

Additionally, other layer thickness and refractive index combinations may be used to suppress reflections at certain visible wavelengths to design a more colorful cold mirror which renders certain spectral characteristics to the reflected and/or transmitted light. A unique advantage of the present invention is that the multilayer mirror may be constructed to correct for wavelength deficiencies in the light source. Thus, the cold mirror and light source combination may be tuned to produced desired reflective characteristics. For example, a jeweler may wish to exhibit certain jewels in a blue light to enhance their brilliance. Further, color rendering may be used to enhance or render the color of an object true to daylight such as a dentist capping a patient's teeth or a surgeon viewing the color of an organ during surgery to determine whether that organ is healthy or diseased.

A substantial majority of the individual layers of the mirror have optical thicknesses in the range where the sum of the optical thicknesses in a repeating unit (such as AB for a two component mirror) are in the range of from about 190 nm to about 340 nm. In a preferred embodiment of the invention, for a two component mirror having a repeat unit AB, the first and second polymeric materials differ from each other in refractive index by at least about 0.03 in the wavelength range of from about 380–680 nm, and the ratio of optical thicknesses of the two polymer components, the "f-ratio" is ½ to suppress second order reflections from the mirror.

In another embodiment of the invention, at least 80% of infrared light of wavelengths of between about 680–2000 nm incident on the mirror is transmitted.

A number of substantially transparent polymers are suitable for use in the present invention. In a preferred embodiment of the invention, the first polymeric material comprises polystyrene and the second polymeric material comprises polyethylene. Generally, the individual polymers chosen for use in the cold mirror must be substantially transparent to wavelengths in the infrared spectrum (about 680–2000 nm). While at least two optically dissimilar polymers may be used, multicomponent structures of three or more diverse polymers are within the scope of the invention.

In certain embodiments of the invention, it is desirable to produce the polymeric cold mirror to comprise at least 200 or more layers. Increasing the number of layers in the polymeric mirror has been found to increase its reflectivity (i.e., the percentage of incident light reflected from the mirror). Thus, by controlling the number of layers, the degree of reflectivity of the mirror may be controlled. To increase the reflectance of the mirror even further, the number of layers may be increased to in excess of a thousand layers or more. Reflectance values of greater than 80% for the visible portion of the spectrum between about 380–680 nm are well within the scope of the invention. However, care must be taken that the overall thickness of the mirror does not become too great, as thicker mirrors may absorb more light. Total mirror thicknesses of between about 0.025 mm to 6.35 mm (1.0 to 250 mil) are within the scope of the invention, with thicknesses of between about 0.635 mm to 3.18 mm (25 to 125 mil) being preferred.

To enable the polymeric cold mirror to be formed into a desired shape, it is most preferably laminated to or coextruded with a transparent substrate. Alternatively, the polymeric cold mirror may be produced as a film, formed into a desired shape, and then laminated to a preformed substrate having the same shape. Other techniques for making the cold mirror include insert injection molding in which a film of the polymeric cold mirror is inserted into a mold and a polymeric substrate material is injected into the mold and against the film to provide structural support. Suitable transparent substrates include single sheets of those polymers useful in the practice of the present invention as well as glass. A thermoformable material or a material which can be extruded into a desired reflector configuration is preferred. The use of opaque substrates is also possible for those uses in which it is desired to diffusely reflect in the infrared portion of the spectrum. Further, the polymeric cold mirror of the present invention may be post formed into concave, convex, parabolic, etc. shapes. Such cold mirrors would be more resistant to breakage than would cold mirrors formed on a glass substrate.

It is also possible to manufacture the polymeric cold mirror as a stand-alone sheet or film. Further, a cold mirror sheet or film may be cut into small pieces (platelets) and mixed with a liquid vehicle to form a coatable dispersion. Thus, a cold mirror may be formed on any substrate by simply coating the dispersion onto the substrate. Alternatively, the cold mirror may be formed from a multiplicity of mirror platelets which are embossed into the surface of a substrate, such as, for example, through the use of embossing rolls while a polymeric substrate is heated and softened.

The mirror may also be formed from a multiplicity of mirror platelets which are spread onto the surface of an adhesive substrate and secured thereto. The mirror may also be formed from a multiplicity of mirror platelets which are spread onto the surface of a substrate and then laminating a transparent sheet over the mirror platelets.

In a preferred embodiment of the invention, the polymeric cold mirror includes first and second diverse polymeric materials of alternating layers in a repeating unit AB. The polymeric cold mirror may also include a protective skin layer on at least one major surface thereof. The skin layer may be sacrificial, or may be permanent and serve as a scratch resistant or weatherable protective layer. Further, such skin layers may be post applied to the mirror after coextrusion. For example, a skin layer may be applied as a sprayed on coating which would act to level the surface of the mirror to improve optical properties and impart scratch resistance, chemical resistance and/or weatherability. The skin layer may also be laminated to the multilayered polymeric mirror. Lamination is desirable for those polymers which are not readily extrudable.

Accordingly, it is an object of the present invention to provide an all-polymeric cold mirror which reflects light at visible wavelengths while transmitting infrared wavelengths, is lower in cost than previously used cold mirrors, and may be laminated to various substrates for use. These, and other objects and advantages of the present invention will become apparent from the following detailed description, the accompanying drawings, and the appended claims.

DETAILED DESCRIPTION OF THE PREFERRED EMBODIMENTS

Figure 1:
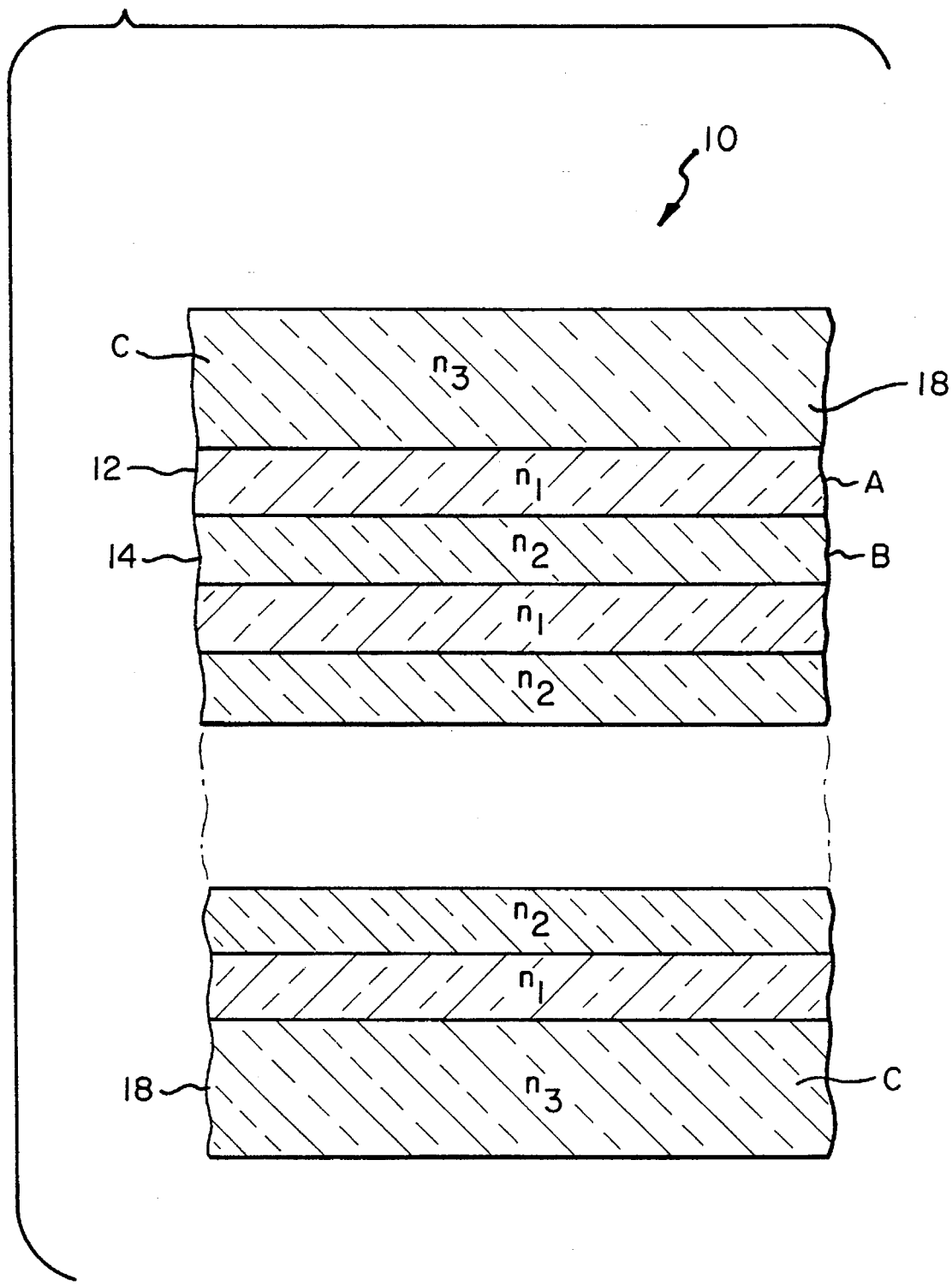
FIG. 1 is a schematic cross section of the two component polymeric cold mirror of the present invention, the film including protective skin layers on both exterior surfaces thereof.

The present invention provides all-polymeric cold mirrors having a number of advantages over prior art cold mirrors including lower costs to produce, formability, both during manufacture and post-manufacture, and the capability of being laminated to a variety of substrates.

The optical theory of multiple reflections from layers having differing refractive indices demonstrates the dependency of the effect on both individual layer thickness and refractive index of the material. See, Radford et al, "Reflectivity of Iridescent Coextruded Multilayered Plastic Films", *Polymer Engineering and Science,* 13, 3, p. 216 (1973). The primary or first order reflected wavelength for a two component all-polymeric cold mirror for normal incidence is given by the equation below.

$$\lambda_I = 2(n_1 d_1 + n_2 d_2)$$

where $\lambda_I$ is the wavelength of first order reflection in nanometers, and spans a part or all of the range of 380–680 nm, $n_1$ and $n_2$ are the refractive indices of the two polymers, and $d_1$ and $d_2$ are the layer thicknesses of the two polymers, also in nanometers. If $d_1 = d_2$, then the sum of the optical thicknesses in a repeat unit varies within the range of from about 190 nm to 340 nm.

As can be seen, the first order reflected wavelength is proportional to the sum of the optical thicknesses of the two polymers (where optical thickness, $n_1 d_1$, is the product of layer thickness times refractive index). In addition to the first order reflections, higher order reflections occur at integer fractions of the first order. The relative intensity of these higher order reflections depends on the ratio of the optical thickness of the polymer components. A specific ratio of optical thicknesses, the f-ratio, may be chosen to suppress selected higher order reflections, where the optical thickness ratio, $f_i$, is defined as:

$$f_i = \frac{n_i d_i}{\sum_{i=1}^{m}(n_i d_i)}$$

and m is the number of layers in the optical repeat unit, $n_i$ is the refractive index of polymers i, and $d_i$ is the layer thickness of polymers i.

To produce a polymeric cold mirror which reflects a broad bandwidth of wavelengths in the range of from about 380–680 nm, a layer thickness gradient may be introduced across the thickness of the mirror. Thus, in one embodiment, the layer thicknesses will increase monotonically across the thickness of the mirror. By monotonically, it is meant that the layer thicknesses increase at a predetermined rate across the thickness of the mirror. See Schrenk, U.S. Pat. No. 3,687,589. As can be seen from the above equations, variations in individual layer thickness, d, have a direct effect on the optical properties of the mirror.

The layer optical thicknesses needed for reflecting in the 380–680 nm range described above have all been described for reflectance of light at normal incidence (i.e., 0°) on the mirror. The reflected wavelength varies with the angle of incidence of light. As the angle of incidence varies from 0° (normal incidence) to 45°, the shift is about 55 nm. Thus, a cold mirror in accordance with the present invention could be designed for a particular angle of incidence to shift reflected wavelengths into a desired range such as the visible range.

To accommodate the wavelength shift and the probability that not all light will strike the cold mirror at normal incidence, the layer optical thicknesses may be designed to accommodate this somewhat larger range of 380 nm to about 782 nm. The maximum optical thicknesses of the layers in this design would increase about 15%, so that the sum of optical thicknesses in a repeating unit are in the range of from about 190 nm to about 391 nm. Such a design would insure that substantially all visible light impinging upon the mirror was reflected, even if the light were incident at an angle other than normal to the mirror.

FIG. 1 schematically illustrates a two-component all-polymeric cold mirror 10 having a repeating unit AB in accordance with the present invention. The mirror 10 includes alternating layers of a first polymer (A) 12 having a refractive index, $n_1$, and a second polymer (B) 14 having a refractive index, $n_2$. FIG. 1 shows a preferred form of the invention where substantially all of the layers of the mirror have optical thicknesses where the sum of the optical thicknesses of the repeat unit varies between about 190 nm to about 340 nm. FIG. 1 also depicts skin layers of a polymer (C) 18 positioned on both major exterior surfaces of the mirror to protect the other layers from scratches or weathering, to provide support for the other layers, or to act as adhesive layers for lamination to a supporting substrate. The skin layer polymer may be the same or different on each surface. Moreover, the refractive index, $n_3$, of the skin layer polymers may be the same as or different from the inner layers A and B.

Preferably, the polymers-chosen have a refractive index mismatch of at least 0.03 at the wavelengths 380–680 nm. A preferred polymeric cold mirror includes polystyrene as the first polymeric material and polyethylene as the second polymeric material. Generally, the individual polymers must be substantially transparent to wavelengths in the near infrared spectrum (about 680–2000 nm).

When reflection of ultraviolet wavelengths is undesirable, it is preferable that an ultraviolet absorbing dye be present in one or both of the exterior skin layers or in one or more interior layers. The ultraviolet absorbing dye may also be present in a post-applied coating or layer. Many thermoplastic polymers have ultraviolet absorbing compounds incorporated therein to improve stability.

Alternatively, reflections occurring at ultraviolet wavelengths may be suppressed by the use of layer thickness and refractive index combinations which selectively suppress reflections at those wavelengths. Where transmission of ultraviolet wavelengths is desired, polymers which are inherently resistant to degradation by ultraviolet light are preferably used. Such polymers include polyvinylidene fluoride and polymethyl methacrylate, which are resistant to degradation by ultraviolet light as well as being nonabsorbers of ultraviolet light.

The reflective multilayered polymeric bodies of the present invention may comprise alternating layers of a wide variety of generally transparent thermoplastic materials. Suitable thermoplastic resins are listed in Wheatley et al, U.S. Pat. No. 5,122,905, the disclosure of which is hereby incorporated by reference. Polyetherimides, such as the ULTEM (trademark) resins available from the General Electric Company are especially useful where high temperatures may be encountered by the cold mirror and may be used either as a layer or substrate material. Other useful polymers include the KAMAX (trademark) resins (refractive index 1.54) available from Rohm and Haas which are copolymers of gluterimide and methyl methacrylate which also may be used either as a layer or substrate material.

It is preferred that the polymers selected have compatible rheologies for coextrusion. That is, a preferred method of forming the polymeric cold mirrors is the use of coextrusion techniques, so the melt viscosities of the polymers must be reasonably matched to prevent layer instability or nonuniformity. The polymers used also should have sufficient interfacial adhesion so that the films will not delaminate. Again, permanent or sacrificial skin layers may be used.

In another embodiment of the invention, elastomers may be used as the alternating polymeric materials. Use of elastomers may be used to impart a number of desirable properties to the cold mirror. For example, an elastomeric cold mirror may be deformed to create a variable focal length mirror. Additionally, reversibly stretching and/or relaxing an elastomeric mirror will move the peak reflectance characteristics of the mirror; the mirror may be "tuned" to reflect desired wavelengths by stretching or relaxing the elastomers. Suitable elastomers for use as alternating polymeric materials in the present invention are described in Schrenk et al, U.S. Pat. No. 4,937,134, the disclosure of which is incorporated by reference.

The polymeric cold mirrors of the present invention possess major advantages over prior art cold mirrors which use expensive and time consuming multilayer dielectric or dichroic coatings which are sequentially deposited on a glass or polymeric substrate by chemical vapor deposition techniques. The polymeric cold mirrors of the present invention transmit infrared wavelengths of light, reflect visible wavelengths, and can be tailored to reflect or absorb ultraviolet wavelengths. Further, the mirrors can be readily coextruded and can have larger surface areas than prior art cold mirrors. The mirrors can be formed into simple or complex shapes either during extrusion or by post-forming operations such as thermoforming. In addition, they can be laminated to polymeric or nonpolymeric substrates for a variety of applications.

Figure 4:
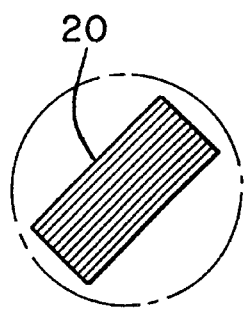
FIG. 4 is a schematic cross section of a liquid dispersion of cold mirror platelets which may be coated onto a substrate.
Figure 4A:
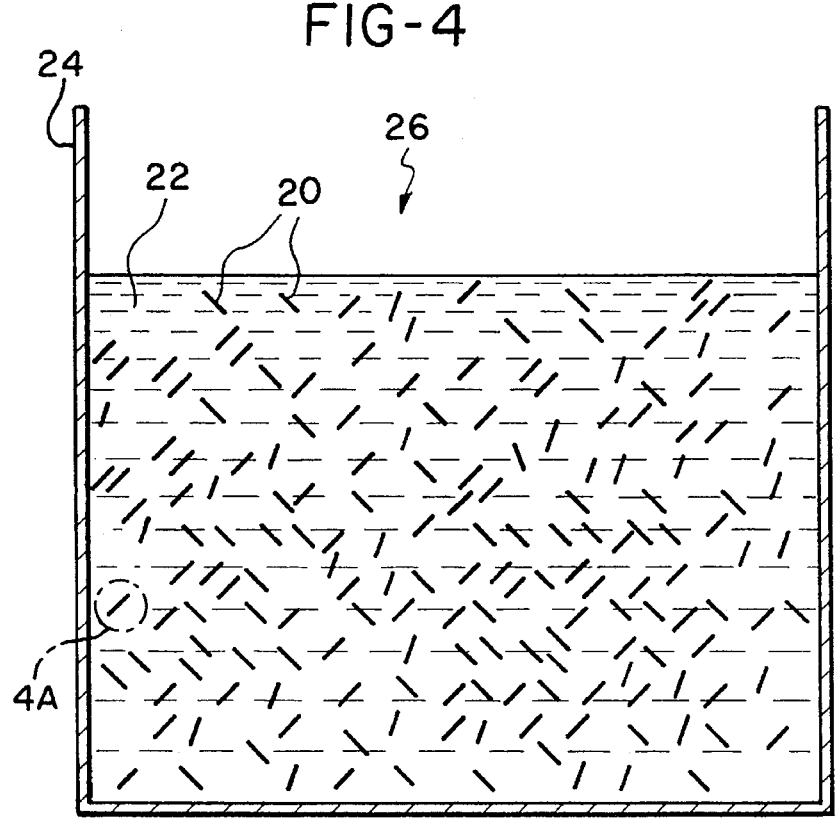
FIG. 4A is an enlarged view of one of the platelets which are schematically shown in FIG. 4.
Figure 5:
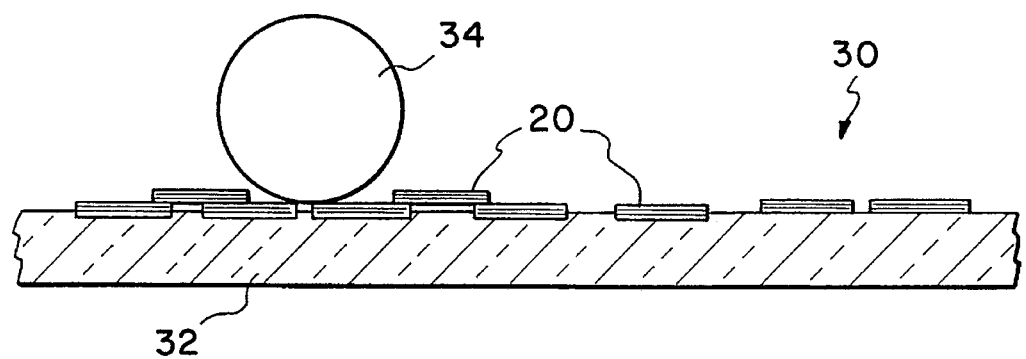
FIG. 5 is a schematic cross section of an embossing roll embossing the cold mirror platelets into the surface of a heated substrate.

As shown schematically in FIGS. 4 and 4A, a cold mirror sheet of film may be cut into small pieces (platelets) 20 and mixed with a liquid vehicle 22 in a container 24 to form a coatable dispersion 26. Thus, a cold mirror may be formed on any substrate by simply coating the dispersion 26 onto a suitable substrate. Alternatively, as shown schematically in FIG. 5, a cold mirror 30 may be formed from a multiplicity of mirror platelets 20 which are embossed into the surface of a polymeric substrate 32, such as, for example, through the use of an embossing roll 34 while substrate 32 is heated and softened.

Figure 6:
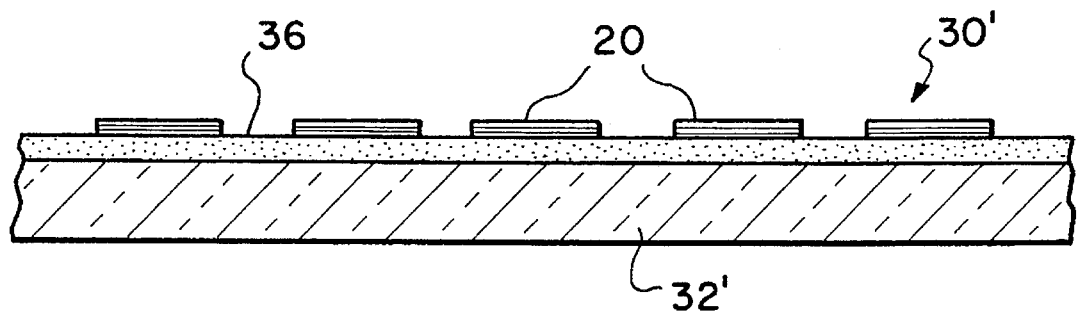
FIG. 6 is a schematic cross section of the cold mirror platelets adhered to the surface of a substrate.
Figure 7:
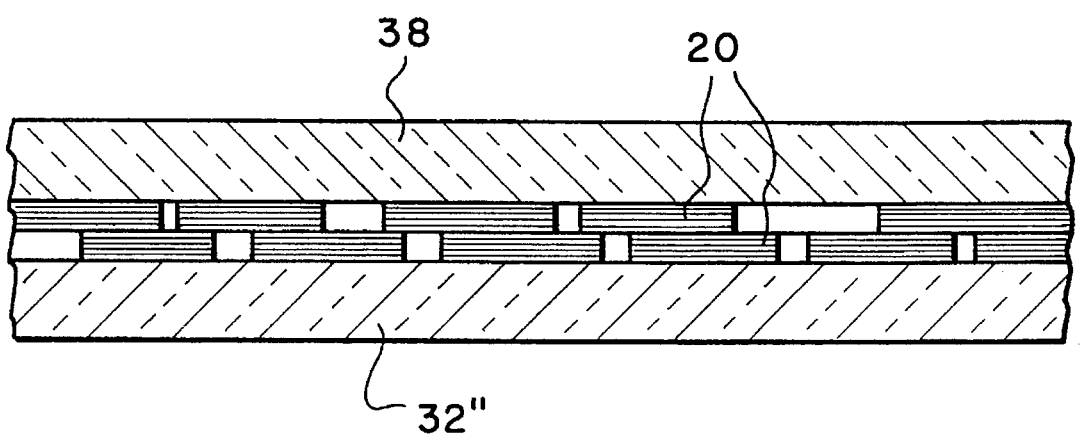
FIG. 7 is a schematic cross section of the cold mirror platelets on the surface of a substrate with a transparent sheet laminated over the platelets.

As shown schematically in FIG. 6, a cold mirror 30' may also be formed from a multiplicity of mirror platelets 20 which are spread onto the surface of a substrate 32' and secured thereto by an adhesive layer 36. A cold mirror may also be formed, as schematically shown in FIG. 7, from a multiplicity of mirror platelets 20 which are spread onto the surface of substrate 32" and the laminating a transparent sheet 39 over the mirror platelets 20.

Polymeric cold mirrors in accordance with the present invention are most advantageously prepared by employing a multilayered coextrusion device as described in U.S. Pat. Nos. 3,773,882 and 3,884,606, the disclosures of which are incorporated herein by reference. Such a device provides a method for preparing multilayered, simultaneously extruded thermoplastic materials, each of which are of a substantially uniform layer thickness. Preferably, a series of layer multiplying means as are described in U.S. Pat. No. 3,759,647, the disclosure of which is incorporated herein by reference may be employed.

The feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final cold mirror. Optionally, the multilayered stream may be subsequently passed through a series of layer multiplying means in order to further increase the number of layers in the final cold mirror.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a polymeric cold mirror in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the mirror after extrusion are all factors which affect the thickness of the individual layers in the final cold mirror.

Layer thickness gradients may advantageously be introduced into the multilayer-body by controlling the volume of heat plastified polymers passing through the feed ports of the co-extrusion device as taught in Schrenk, U.S. Pat. No. 3,687,589. Alternatively, the layer thickness gradients may be introduced upstream of the interfacial surface generators by the use of adjustable valves to control the amount of heat plastified polymer introduced at the various feed slots to the ISG's. In yet another alternative method for introducing a layer thickness gradient into the multilayer polymeric body, a temperature gradient may be imposed on the feedblock to the co-extrusion device.

The all polymeric cold mirrors of the present invention find application in a number of uses. For example, they may be used in medical and dental lighting applications where it is desirable to illuminate a subject without heating the surrounding area and/or where it is desirable to render the color projected by the lighting fixture true to daylight. Use of cold mirrors in theatrical lighting eliminates uncomfortable conditions for performers. Cold mirrors may also be used for different color masking effects.

In addition, use of a cold mirror which absorbs ultraviolet light may be used in art displays where it is desirable to protect works of art from degradation by ultraviolet light as well as from increased temperatures resulting from infrared light. Projectors and photocopy machines may also utilize polymeric cold mirrors to allow intense visible lighting with transmission of infrared light out of the apparatus. Polymeric cold mirrors may also be used in security applications as a lens which rejects visible light and allows infrared light to pass through so that areas may be illuminated with invisible light and viewed with an infrared sensitive camera.

Cold mirrors which reflect ultraviolet light may find use as lighting for agricultural purposes for plants which grow with visible and ultraviolet light. The solar infrared light can be separated by the cold mirror and used for another purpose such as for heating water.

Cold mirrors may also be used to produce solar energy by converting the sun's visible energy into electricity through photovoltaic cells while removing unnecessary infrared light to be used for an alternative operation. It is known that the presence of infrared light degrades the efficiency of photovoltaic cells, and the removal of infrared light will improve the efficiency of such cells.

Automotive lighting may also benefit from the use of cold mirrors in which visible light illuminates a roadway while infrared light is transmitted through the reflector to an open area of the car engine compartment where it can dissipate. Even general lighting applications can benefit from the use of the cold mirrors of the present invention as more compact and economical lighting fixtures may be utilized because of the heat dissipation capabilities of the mirrors.

In order that the invention may be more readily understood, reference is made to the following examples, which are intended to be illustrative of the invention, but are not intended to be limiting in scope.

EXAMPLE 1

A polymeric cold mirror was produced using microlayer coextrusion equipment as described in U.S. Pat. Nos. 3,773,882 and 3,884,606, incorporated herein by reference. The polymeric cold mirror comprised 400 alternating layers of polystyrene (Styron 685D, refractive index=1.57) and polyethylene (Dow 12065, refractive index=1.5). The mirror consisted of approximately equal volumetric compositions of polystyrene and polyethylene and was fabricated with a removable skin layer of polypropylene (Shell 5524) on both major surfaces. Extrusion temperatures were approximately 500° F., and the extruder pumping rates were as follows: 1) polyethylene: 20 lb/hr.; 2) polystyrene: 20 lb/hr, and 3) polypropylene: 15 lb/hr. The layered melt stream was spread in a 16" wide coat hanger style die and cooled on a chill roll film unit before winding on the film roll. Final film thickness was 0.002" (core thickness) so that the first order reflectance peak was in the visible range. The film had a golden appearance when viewed in reflection.

EXAMPLE 2

Figure 2:
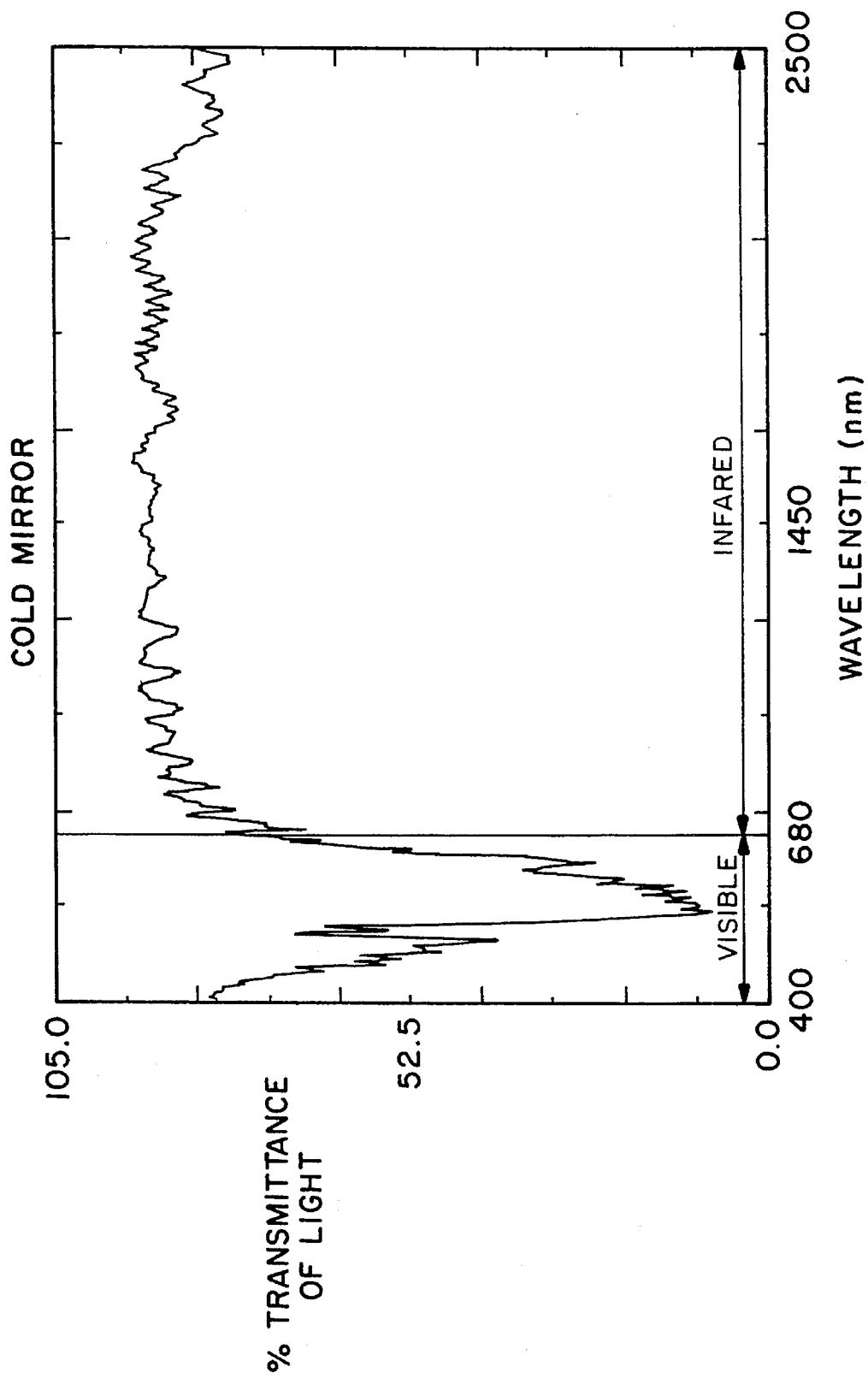
FIG. 2 is a graph of wavelength versus transmission for a polymeric cold mirror fabricated in accordance with the present invention.

A transmission spectrum was run on the sample obtained from Example 1 using a Shimadzu spectrophotometer at a 0° angle of incidence. FIG. 2 depicts the results which indicated high broad band visible reflection (380–680 nm) and high transmission in the infrared region (680–2500 nm).

An experiment was conducted by placing the film between an infrared heat lamp (125 watt General Electric IR flood) and a type J thermocouple (blackened to facilitate absorption). The light source was positioned 6 inches away from the film, and the thermocouple was positioned 1.5 inches on the other side of the film so that the light source and thermocouple were a total of 7.5 inches apart. With no sample located between the light source and the thermocouple, the device registered 131° F. The placement of the film between the bulb and the thermocouple showed only a 2° F. drop in the initial measured temperature, indicating high infrared transmission and only cool visible reflection.

Placement of a polymeric reflective material fabricated in accordance with the teachings of Wheatley et al, U.S. Pat. No. 5,122,905, which reflects in both the visible and infrared ranges between the lamp and thermocouple caused a 30° F. drop in temperature indicating that the sample was a poor infrared transmitter. The use of aluminum in the experiment dropped the temperature to nearly ambient (70° F.), indicating nearly no energy transmission.

EXAMPLE 3

A polymeric cold mirror was produced using microlayer coextrusion equipment as described in U.S. Pat. Nos. 3,773,882 and 3,884,606, incorporated herein by reference. The polymeric cold mirror comprised 2625 alternating layers of polycarbonate (Calibre 302-10, trademark of Dow Chemical Company, 10 melt flow and refractive index=1.586) and polymethyl methacrylate (Cyro Acrylite H15-003, trademark of Cyro Industries, refractive index=1.49). A protective boundary layer of polycarbonate (Calibre 302-22, trademark of the Dow Chemical Company, 22 melt flow) and two outer skin layers on both major surfaces of polycarbonate (a 70/30 by volume blend, respectively, of Calibre 302-22, 22 melt flow, and an 80 melt flow polycarbonate commercially available from Taijin Chemicals) were also used to make the cold mirror.

Extrusion rates were 44 lbs/hr for polycarbonate in the microlayer core, 42 lbs/hr for polymethyl methacrylate in the microlayer core, 10 lbs/hr for polycarbonate in the protective boundary layer, and 15 lbs/hr total for polycarbonate in the top and bottom outer skin layers. A 165 layer melt stream was produced using a semicircular half moon feed block as described in the above mentioned patents. A layer thickness gradient was created in the layers by dividing the feed block into three different zones and maintaining the temperatures in those zones at 490°, 500°, and 470° F., respectively. Other extrusion equipment temperatures were maintained at 500° F.

Four interfacial surface generators (each doubling the number of layers) were used to multiply the 165 layers exiting the feed block to the 2625 layer structure. The 2625 layer melt stream was spread in a coat hanger style die and cooled on a chill roll film unit. The roll unit included three rolls operated in an "open" position meaning that the melt stream only touch the bottom and middle rolls in the stack and was not nipped. The bottom roll had a temperature of 265° F. and the middle roll had a temperature of 210° F. Roll take away speed was sufficient to result in a final film thickness of about 14.5 mil (0.37 mm).

These processing conditions resulted in an approximately 2:1 layer thickness gradient across the core microlayers. This broadened the reflectance peak to span the visible range, resulting in a substantially colorless, silvery appearance. Such a colorless, silvery appearance is not a requirement of the invention, but is desirable for some cold mirror applications. The average layer thickness for the core microlayers was approximately 110 nm with a repeating unit (AB) optical thickness of 340 nm.

Figure 3:
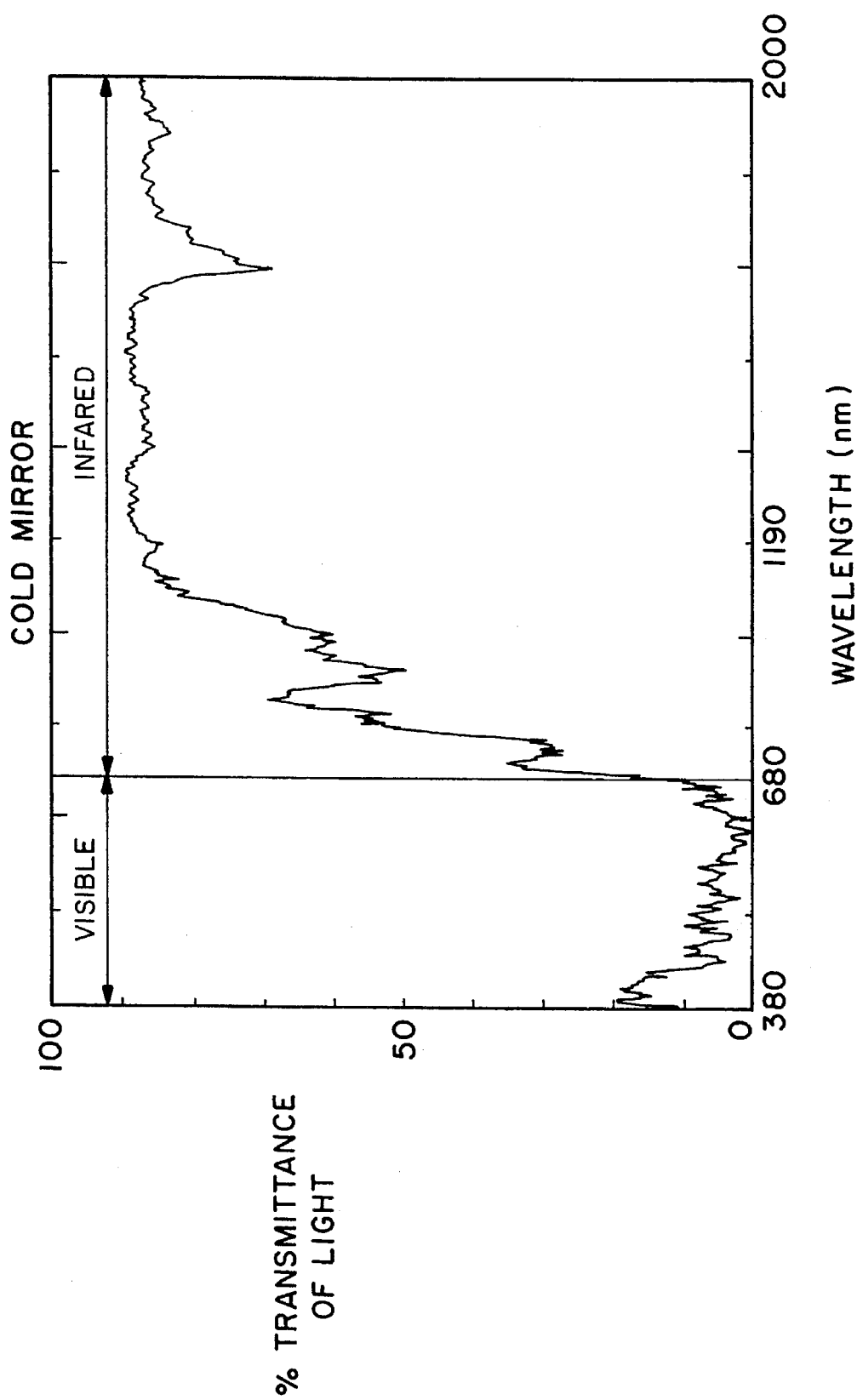
FIG. 3 is another graph of wavelength versus transmission for a polymeric cold mirror fabricated in accordance with the present invention.

A transmission spectrum was run on the obtained 2625 layer sample. Because absorption of polycarbonate and polymethyl methacrylate in the range of 380–2000 nm is negligible, reflectance of the sample may be determined by the relation 1—transmission. As shown by the spectrum in FIG. 3, the sample had an average of 94% reflectance across the visible range (380–680 nm) and an average transmission in the near infrared, 680–2000 nm, of from 80–90%.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An all polymeric cold mirror of at least first and second diverse polymeric materials, the mirror comprising a sufficient number of alternating layers of said first and second polymeric materials such that at least 50% of light across the visible range of wavelengths between about 380–680 nm incident on said polyemric cold mirror is reflected and at least 80% of infrared light of wavelengths of between about 680–2000 nm is transmitted or absorbed, said alternating layers of said first and second polymeric materials having a layer thickness gradient across the thickness of said mirror.

2. The polymeric cold mirror of claim 1 wherein at least 50% of ultraviolet light between about 300–380 nm incident on said polymeric cold mirror is reflected.

3. The polymeric cold mirror of claim 1 wherein at least 50% of ultraviolet light between about 300–380 nm incident on said polymeric cold mirror is absorbed.

4. The polymeric cold mirror of claim 1 wherein a substantial majority of the individual layers of said mirror have optical thicknesses in the range where the sum of the optical thicknesses in a repeating unit of said polymeric materials is between about 190 nm to about 340 nm, and wherein said polymeric materials differ from each other in refractive index by at least about 0.03 in the wavelength range of from about 380–680 nm.

5. The polymeric cold mirror of claim 1 wherein said first polymeric material is polystyrene and said second polymeric material is polyethylene.

6. The polymeric cold mirror of claim 1 wherein said first polymeric material is polycarbonate and said second polymeric material is polymethyl methacrylate.

7. The polymeric cold mirror of claim 1 wherein said polymeric cold mirror comprises at least 200 layers.

8. The polymeric cold mirror of claim 1 wherein at least 80% of peak reflecting visible light of a wavelength of between about 380–680 nm incident on said polymeric cold mirror is reflected.

9. The polymeric cold mirror of claim 1 wherein at least 80% of infrared light between about 680–2000 nm incident on said polymeric cold mirror is transmitted.

10. The polymeric cold mirror of claim 1 wherein said mirror is laminated to or coextruded with a substrate material.

11. The polymeric cold mirror of claim 10 where said substrate material is selected from the group consisting of glass, metal, polycarbonate, polymethyl methacrylate, polyetherimide, and copolymers of gluterimide and methyl methacrylate.

12. The polymeric cold mirror of claim 1 wherein said mirror includes a protective skin layer on at least one major surface thereof.

13. The polymeric cold mirror of claim 12 wherein said protective skin layer is removable.

14. The polymeric cold mirror of claim 1 wherein said mirror is extruded as a profile.

15. The polymeric cold mirror of claim 1 wherein said mirror is post formed into a profile.

16. The polymeric cold mirror of claim 1 in which a coloring agent is incorporated into at least one layer of said mirror.

17. The polymeric cold mirror of claim 1 in which said coloring agent is selected from the group consisting of pigments and dyes.

18. The polymeric cold mirror of claim 1 in which said coloring agent is incorporated into at least one surface layer of said mirror.

19. The polymeric cold mirror of claim 1 in which said coloring agent is incorporated into at least one interior layer of said mirror.

20. The polymeric cold mirror of claim 1 in which said mirror is formed as a coatable composition from a multiplicity of mirror platelets in a liquid dispersion.

21. The polymeric cold mirror of claim 1 in which said mirror is formed from a multiplicity of mirror platelets which are embossed into the surface of a substrate.

22. The polymeric cold mirror of claim 1 in which said mirror is formed from a multiplicity of mirror platelets which are spread onto the surface of an adhesive substrate.

23. The polymeric cold mirror of claim 22 in which said mirror is formed from a multiplicity of mirror platelets which are spread onto the surface of a substrate and a transparent sheet is laminated over said mirror platelets.

24. The polymeric cold mirror of claim 1 in which said polymeric materials are elastomers.

25. The polymeric cold mirror of claim 1 in which at least one of the surfaces of said mirror is embossed or textured to diffuse light reflected or transmitted from said mirror.

* * * * *